June 24, 1941.  W. J. BECK  2,246,497
VIBRATING APPARATUS
Filed Feb. 3, 1938
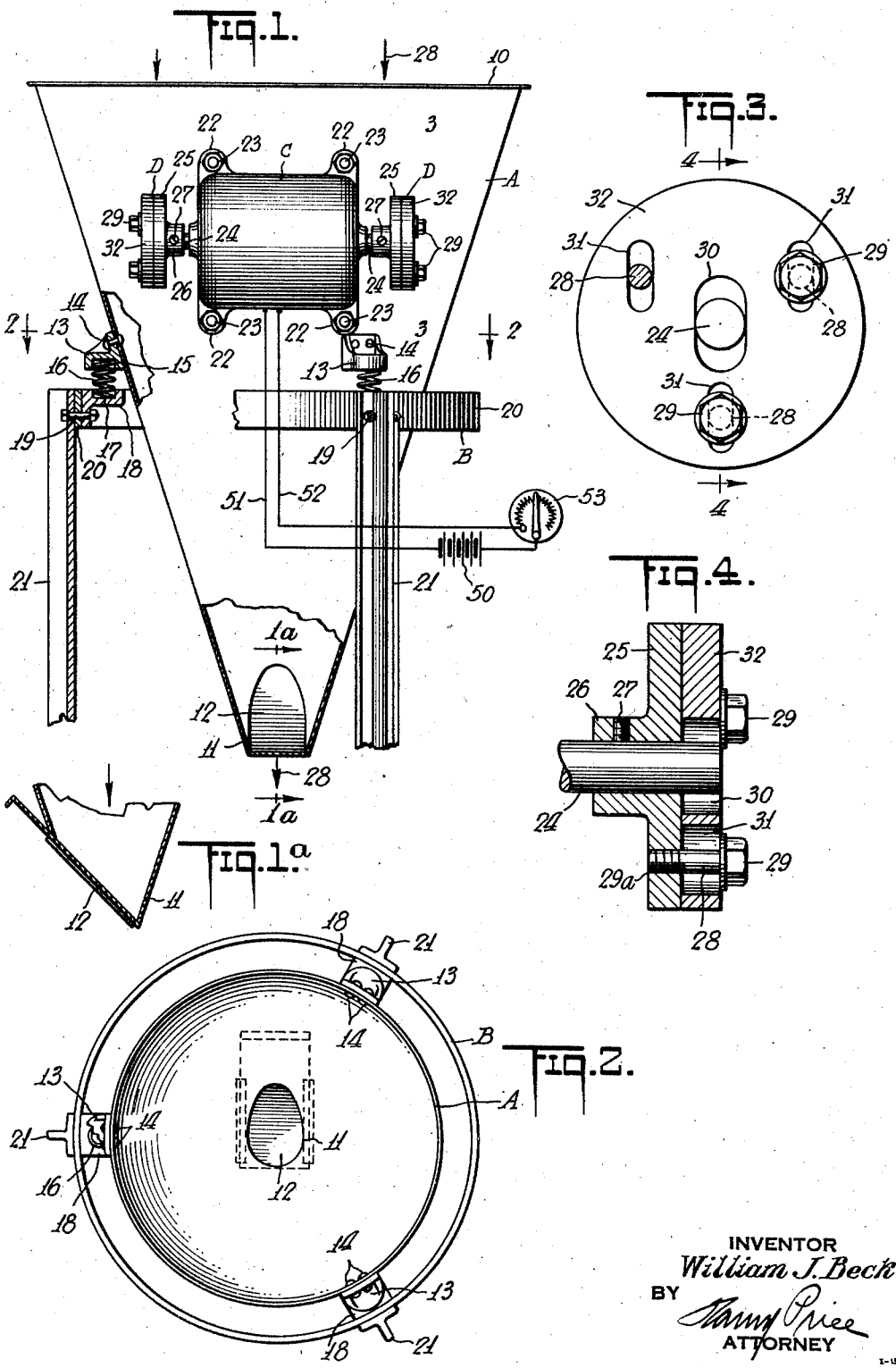
INVENTOR
William J. Beck
BY
ATTORNEY Patented June 24, 1941

2,246,497

UNITED STATES PATENT OFFICE 2,246,497

VIBRATING APPARATUS

William J. Beck, New York, N. Y.

Application February 3, 1938, Serial No. 188,516

5 Claims. (Cl. 221—120)

The present application relates to a vibrating apparatus and it particularly relates to an apparatus designed to vibrate a hopper, pipe, barrel or box to settle material therein or to cause movement or feeding of ground, powdered, pulverized, granular, bean or other divided materials.

With many types of materials, such as beans, salted peanuts, ground coffee, chocolate, puddings and so forth, the difficulty is often experienced that this material will not settle in a container, nor feed through a hopper trough, cone or other conduit without caking and stoppage due to the adhesion or cohesion between the particles and the walls of the vessel.

It is among the objects of the present invention to provide improved methods and means of regulating the settlement, movement and feed of divided or granular materials of the character above described, which may be utilized in connection with any type of apparatus, as for example where the divided or granular material is to be continuously or intermittently fed as, for example, in an automatic weighing machine apparatus.

It is another object of the present invention to provide an improved vibration control apparatus, which not only is inexpensive and durable, but also will assure settlement, movement or feed of divided or granular materials, particularly of the type tending to cake or arch, even when passing through a conduit having only a slight or zero inclination to the horizontal.

Other objects will be obvious or will appear during the course of the following specification.

In accomplishing the above objects it has been found satisfactory, according to one embodiment of the present invention, to attach rotary or rotating element or shaft or an electric motor having a balanced rotor to the container, cone, trough or other conduit in or through which the divided or granular material is to be settled or moved.

Then the rotating element or motor is preferably provided with a relatively light unbalanced load, which will permit it to run substantially with the characteristics of an unloaded motor and which will cause vibration to be transmitted to the support of the element or motor and by said support to the conduit through which the divided or granular material is to be moved or settled.

In this connection it has been found most satisfactory to support the container or conduit rigidly, but it may also be supported resiliently so that the resilient support will tend to oppose or resist or damp the vibration resulting from the unbalanced load upon the shaft or motor. It has been found particularly desirable, according to one embodiment of the invention, to unbalance the motor in such a way and manner as to cooperate with the support of the container conduit and with the material so that a settlement or vibration of the material or a feed will result through, and from, a predetermined portion of the conduit, trough, funnel, or other means through which the divided or granular material is passing to a point of segregation or utilization.

In the drawing which shows one of the many various embodiments of the present invention but to which the invention is by no means restricted, since many changes and modifications might be made all within the scope of the present invention:

Fig. 1 is a front elevation in partial section showing the attachment of the motor to a container or conduit formed of an inverted frustrated cone, which is resiliently supported upon a frame, said cone constituting one of the various forms of conduits which may be employed.

Fig. 1a is a fragmentary side view of the bottom of the feeding cone on the line 1a—1a of Fig. 1.

Fig. 2 is a transverse sectional view on the line 2—2 of Fig. 1.

Fig. 3 is a side elevation view in partial section and upon an enlarged scale on the line 3—3 of Fig. 1.

Fig. 4 is a vertical transverse sectional view on the line 4—4 of Fig. 3.

Referring to Figs. 1 to 4, the cone A constitutes a conduit to feed granular or divided materials, such as finely powdered or ground coffee or cocoa, to a weighing, segregating or proportioning machine. The cone A is resiliently supported on frame B. The cone A supports the motor C having the off-center loading devices D.

Instead of cone A, it is obvious that other forms of containers, troughs, downwardly inclined conduits, feeding hoppers, and so forth, could be utilized.

The conical structure A is provided with an upper inlet 10, a lower mouth 11, which is shown as being cut off obliquely as indicated in Fig. 1a and has the adjustable gate 12 to control the amount of material which will feed downwardly through the open mouth portion. The stream might also be cut off by a straight or transverse gate.

Attached to the conical structure A at 14 are a plurality of outstanding socket elements 13 having sockets 15, which sockets receive the upper ends of the coil springs 16. The springs 16 serve as resilient supports for the conical structure A. The coil springs 16 are inserted at their lower ends in the sockets 17 in the brackets 18. The brackets 18 are riveted at 19 to the ring structure 20 which in turn is connected to the frame legs 21.

The motor C as shown is provided with the four outstanding attachment lugs or legs 22 which may be connected by the bolts 23 to a conforming portion of the conical structure A. The motor C is provided with suitable electrical connections 51 and 52 and with a balanced rotor not shown. The source of electric power is diagrammatically represented as a battery at 50 but it is apparent that any suitable 110 or 220 volts A. C. or D. C. supply may be employed. The rheostat 53 may be employed to vary the motor speed and the frequency of the vibration.

The main shaft 24 of the motor carries the off-center or adjustable loading elements D. The off-center loading device may be fixed as well as adjustable. These elements D consist of a fixed disk 25 having the collar 26 which is attached by the set screw 27 to the ends of said shaft 24. The loading structure D, as shown, may be symmetrically positioned on each side of the motor C as shown in Fig. 1, but if desired such loading structure need only be positioned at one side of the motor.

As shown, the axis of the shaft 24 of the motor C may be positioned transversely to the direction of the feed indicated by the arrows 28, but it may be preferred to mount the axis of the shaft 24 parallely to the direction of the feed or at intermediate angles.

As shown, the shaft 24 is also transverse to the axes of the coil springs 16, which resiliently support the construction structure A from the framework B. The relative position of the axes of the resilient supports and the axis 24 of the motor C may be other than shown.

As shown in Figs. 3 and 4 the shaft end 24 may project through the fixed disk 25 and be received in a central slot 30 in the adjustable disk 32. The fixed disk may also be provided with the bolts 29 having the smooth guide shanks. The threaded ends of the bolts 29 may be received in the tapped openings 29a (see Fig. 4). The shaft end 27 and the shanks 28 fit in the parallel spaced slots 31 of the movable disk element 32.

In the position, shown in Fig. 3, the disk 32 will be substantially balanced upon the shaft 24 and the motor C will operate without vibrating or without transmitting any particular vibratory force to the cone A through its supports 22.

However, when the bolts 29 are loosened and the slotted disk 32 is moved away from its central position, the motor C will become unbalanced and will transmit a substantial vibratory force to the cone A through its supports 22. Other arrangements may also be used for unbalancing the motor.

It has been found most desirable that this vibratory force be of such a character as to cause an almost imperceptible vibration in the walls of the cone A. The walls of the cone A may be of light sheet metal material, boiler plate, cast metal or even wood and the construction should be such that the vibration will be communicated to the entire body of the cone. At the same time the throw or force exerted by the off-center plates 32 on one or both sides of the shaft 24 will be resisted by the coil springs 16 which will tend to resist each impulse given to the cone A by the unbalanced load D of the motor.

Preferably the rotation of the motor C should be so regulated as to give a desired number of impulses to the cone A per second and to accomplish this, the speed of the motor when unloaded should preferably be regulated within a wide range.

Under these conditions it is found that finely divided or pulverized materials, such as ground coffee, chocolate pudding or cocoa, may be fed with substantially constant uniform flow through many different types of conduits and troughs without caking or stoppage and without any substantial increase in the aeration.

Where it is desired to cause increased feed from one side of the trough, cone or conduit to the other, this may be accomplished by controlling the unbalanced loading. Where the motor has only one projecting shaft end or only one side of the motor is unbalanced it may be desirable to mount the shaft in vertical position.

The intensity and frequency of the vibrations may be changed by the amount in which the plate 32 is positioned off-center and by rheostats connected to the motor or its field respectively.

Instead of one or both members D being adjustable, it is possible that these members might have a fixed eccentricity.

As shown in Fig. 1, the weight of the hopper A is designed to hold it down upon the supports 21 and compress the spring 16, but usually it is desirable to provide additional means to hold the cap elements 13 closely adjacent to the cap elements 18 so that the hopper will not tend to bounce off its supports upon substantial vibration.

Many other changes could be effected in the particular features of vibrating apparatus, and in methods of operation set forth, and in specific details thereof, without substantially departing from the invention intended to be defined in the claims, the specific description herein merely serving to illustrate certain elements by which, in one embodiment, the spirit of the invention may be effectuated.

What is claimed is:

1. A feeding device for finely divided materials, such as beans, salted peanuts, ground coffee, chocolate, puddings and so forth comprising a downwardly converging conduit for feeding the finely divided materials, a motor mounted to transmit vibration thereto, said motor being mounted adjacent the top of the conduit and directly on the side of the conduit with its shaft extending horizontally transversely of the axis of said conduit and a means to unbalance the load on said motor, said means including a shaft extension on said motor, a fixed disk on said shaft, an adjustable disk upon said fixed disk and means to vary the adjustable disk in respect to the said fixed disk and to fix said disk in an adjusted position in respect to said fixed disk, the planes of said disks being transverse to the axis of the shaft extension and said disks closely contacting one another and being adjustable in respect to each other in a direction transverse to the axis of said extension.

2. In a feeding apparatus for finely divided materials, such as beans, salted peanuts, ground coffee, chocolate, puddings and so forth which tend to cake and are subject to stoppage, a downwardly converging conduit through which said materials are fed, a rotary electric motor mounted upon said conduit, said motor being mounted adjacent the top of the conduit and directly on the side of the conduit with its shaft extending horizontally transversely of the axis of said conduit, said motor having shaft extensions on both sides of said motor and adjustable disks attached to and closely contacting said fixed disks, said fixed disks being provided with collars which are fixed to said shaft extensions, and being provided with guide pins and said adjustable disks being provided with parallel slots in which said guide pins are received, and means to lock the adjustable disks in an adjusted position in respect to the fixed disks.

3. A feeding apparatus for finely divided pulverized or powdered materials, such as beans, salted peanuts, ground coffee, chocolate, puddings and so forth comprising a conduit or feed hopper converging downwardly, a frame structure embracing the lower portion of said conical conduit, said frame structure having spaced cups around the periphery thereof at a position intermediate of the height of said conical conduit, said conduit having outstanding cup structures to cooperate with the cup structures upon said frame structure, coil springs vertically positioned between and supported in said cup structures and supporting said conical conduit from said frame, a rotary electric motor mounted upon said conical conduit above said frame and above said cup structures and substantially below the top of said hopper, said motor being provided with a shaft which is transverse to the axis of the conduit and is provided with extensions beyond the motor, fixed disks attached to said extensions on each side of said motor, said disks having collars fitting upon said shaft extensions and fixed upon said shaft extensions, adjustable disks positioned against each of said fixed disks having a central slot receiving the ends of said shaft extensions, said fixed disks having a plurality of spaced pins positioned around said shaft extensions and said adjustable disks having a plurality of parallel slots receiving said pins, and lock means carried by said pins to fix said movable disks in adjusted position to unbalance said motor and cause a vibration to be transmitted from said motor to said conical conduit.

4. In combination with a downwardly converging conical hopper having symmetrically spaced resilient supports adjacent the middle thereof, a motor mounted on said hopper above said supports having its axis transverse to the axis of said hopper.

5. In combination with a downwardly converging conical hopper having symmetrically spaced resilient supports adjacent the middle thereof, a motor mounted on said hopper above said supports having its axis transverse to the axis of said hopper, said resilient supports including coil springs, the axes of which are vertically disposed.

WILLIAM J. BECK.